(12) United States Patent
Shibata

(10) Patent No.: US 11,874,544 B2
(45) Date of Patent: *Jan. 16, 2024

(54) DISPLAY DEVICE

(71) Applicant: Trivale Technologies, Santa Clara, CA (US)

(72) Inventor: Ippei Shibata, Kumamoto (JP)

(73) Assignee: Trivale Technologies, Santa Clara, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/240,583

(22) Filed: Apr. 26, 2021

(65) Prior Publication Data

US 2021/0389616 A1 Dec. 16, 2021

Related U.S. Application Data

(63) Continuation of application No. 16/447,346, filed on Jun. 20, 2019, now Pat. No. 10,989,940.

(30) Foreign Application Priority Data

Jul. 10, 2018 (JP) .................................. 2018-130733

(51) Int. Cl.
   *G02F 1/1333* (2006.01)
   *G02B 1/14* (2015.01)

(52) U.S. Cl.
   CPC ............ *G02F 1/1333* (2013.01); *G02B 1/14* (2015.01); *G02F 1/133388* (2021.01); *G02F 2201/50* (2013.01); *G02F 2201/56* (2013.01); *G02F 2202/28* (2013.01)

(58) Field of Classification Search
   CPC .... G01N 15/0618; G02B 1/14; G02F 1/1333; G02F 1/133331; G02F 1/133354; G02F 1/133388; G02F 2201/50; G02F 2201/56; G02F 2202/28
   See application file for complete search history.

(56) References Cited

U.S. PATENT DOCUMENTS 10,989,940 B2 * 4/2021 Shibata .................... G02B 1/14
2016/0073518 A1 3/2016 Sato

FOREIGN PATENT DOCUMENTS

| JP | 2003-222830 A | 8/2003 |
|----|---------------|--------|
| JP | 2007-079090 A | 3/2007 |
| JP | 2011-203317 A | 10/2011 |
| JP | 2014-112139 A | 6/2014 |
| JP | 2016-057322 A | 4/2016 |
| KR | 2010-0108756 A | 10/2010 |
| WO | 2014/203711 A1 | 12/2014 |

* cited by examiner

*Primary Examiner* — Lawrence D Ferguson
(74) *Attorney, Agent, or Firm* — Studebaker & Brackett PC

(57) ABSTRACT

Provided is a display device which includes an electrooptical panel and a protection member including a print part in a peripheral region and disposed to face the electrooptical panel to protect the electrooptical panel. The protection member includes a first reference mark in the peripheral region. The electrooptical panel includes a second reference mark in a position corresponding to the first reference mark and is held to have an overlap with the protection member. The print part includes at least the first print layer and a second print layer disposed in a position facing the first print layer. The first reference mark is made up of a hole having a predetermined shape formed in the second print layer.

20 Claims, 5 Drawing Sheets

F I G. 9
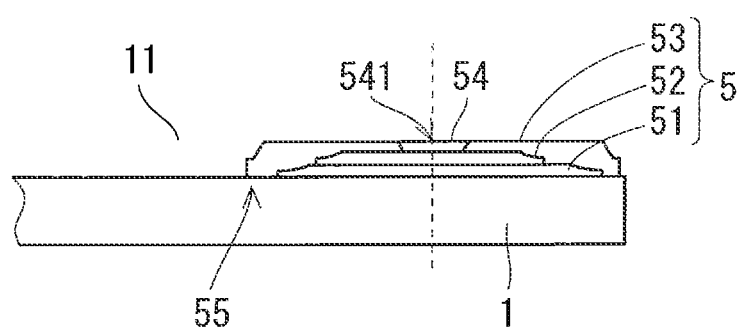

DISPLAY DEVICE

CROSS REFERENCE TO RELATED APPLICATIONS

This application is a Continuation of U.S. patent application Ser. No. 16/447,346 filed on Jun. 20, 2019, which claims benefit of priority to Japanese Patent Application No. 2018-130733 filed Jul. 10, 2018, the entire content of which is incorporated herein by reference.

BACKGROUND OF THE INVENTION

Field of the Invention

The present invention relates to a display device in which a protection member having a print layer is located on a front surface of an electrooptical panel such as a display panel or a touch panel.

Description of the Background Art

In a display device including an electrooptical panel of a display panel or a touch panel such as a liquid crystal display panel or an organic EL panel, a protection member in which a frame-like printing is formed in a peripheral region of an effective display region of the display panel or the touch panel is located.

Recently, there is an increasing demand for a display device having a deformed shape other than a rectangular shape, and a design of the frame-like printing formed in the peripheral region of the protection member near an opening is diversified, thus a design of curvature, for example, is adopted to a corner of the frame-like printing in some cases.

In a display device having a general rectangular shape, a frame-like printing formed in a peripheral region of a protection member is also formed to have a rectangular shape, thus when a display panel or a touch panel is disposed on the protection member, a position adjustment is performed by making a corner part formed on a corner near an opening and a reference mark formed on the display panel or the touch panel coincide with each other. However, when the printing formed in the peripheral region of the protection member has a shape other than the rectangular shape, the corner is not formed near the opening in some cases, so that it is difficult to perform the position adjustment with the reference mark formed on the display panel or the touch panel for adjusting the position.

According to an image display device disclosed in Japanese Patent Application Laid-Open No. 2011-203317, disclosed is a technique of forming a position identification mark in a position other than a corner of a coloring layer having a frame-like shape to determine a correct positional relationship of a front surface plate when the front surface plate is incorporated into the display device. However, the position identification mark disclosed in Japanese Patent Application Laid-Open No. 2011-203317 is used for identifying a correct direction of the front surface plate, and does not disclose the position adjustment of the display panel and the front surface plate facing each other. The position identification mark is formed of a coloring layer or a pattern with a color different from a coloring layer, so that there is a problem that the identification mark is visually recognized from a surface.

SUMMARY

An object is to provide a display device which enables a position adjustment with a reference mark formed on a display panel or a touch panel, which is disposed to face a protection member, even when a print part formed in a peripheral region of the protection member is provided with a shape other than a rectangular shape. Accordingly, the reference mark is not visually recognized from a display surface side.

A display device according to the present invention includes an electrooptical panel and a protection member including a print part in a peripheral region and disposed to face the electrooptical panel to protect the electrooptical panel. The protection member includes a first reference mark in the peripheral region. The electrooptical panel includes a second reference mark in a position corresponding to the first reference mark and is held to have an overlap with the protection member. The print part includes at least a first print layer and a second print layer disposed in a position facing the first print layer. The first reference mark is made up of a hole having a predetermined shape formed in the second print layer.

According to the display device described above, a position adjustment with an electrooptical panel facing a protection member can be performed even when a print part formed in a peripheral region of the protection member is provided with a shape other than a rectangular shape. The display device enables a structure that a reference mark is not visually recognized from a display surface side.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a cross-sectional view of a protection member in another embodiment of the present invention.

DESCRIPTION OF THE PREFERRED EMBODIMENTS

Embodiment 1

Figure 1:
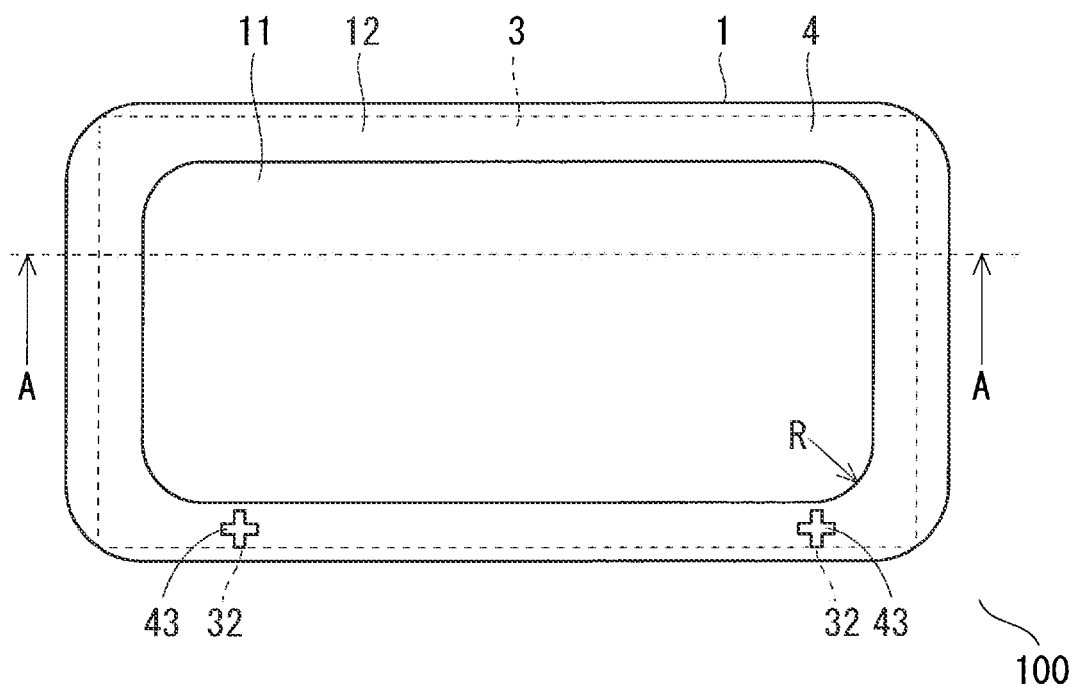
FIG. 1 is a plan view of a display device of the present invention.
Figure 2:
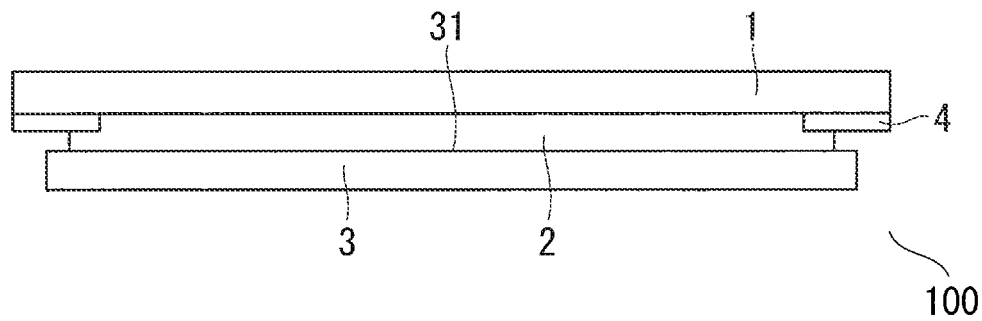
FIG. 2 is a cross-sectional view of the display device along an A-A line in FIG. 1.

Described firstly is a display device of the present invention. FIG. 1 is a plan view of the display device of the present invention, and FIG. 2 is a cross-sectional view along an A-A line in FIG. 1. As illustrated in FIG. 1 or FIG. 2, in a display device 100 of the present invention, a display surface 31 of a display panel 3 is attached to a protection member 1 protecting the display panel 3 using an adhesive bond 2. When the display device 100 includes a touch panel (not shown) on a display surface 31 side of the display panel 3, the touch panel and the protection member 1 are attached to each other using the adhesive bond 2.

A configuration of the protection member 1 of the present invention is described. The protection member 1 of the present invention is a plate-like member made up of a transparent material such as glass or plastic. The protection member 1 includes a frame-like print part 4 corresponding to a display region 11 of the display panel 3 disposed to face one surface of the plate-like member. The print part 4 of the present invention is a black-frame print having a black frame-like shape, disposed to face the display panel 3 of the protection member 1, and includes a double-layer structure made up of a print layer 41 as a first layer and a print layer 42 as a second layer as described below. The print layer 41 as the first layer is applied to the protection member 1, and subsequently the print layer 42 as the second layer is applied. The print part 4 is not blacked out (shown in black) for a purpose of explanation in FIGS. 1 and 2.

The adhesive bond 2 contains a resin material such as a bonding material of optical clear adhesive (OCA). When an air bubble occurs due to a difference in level between the print part 4 and the adhesive bond 2 at a time of attaching the protection member 1 and the display panel 3, a bonding material filling the difference in level between the print part 4 and the adhesive bond 2 needs to be selected. A liquid resin of optical clear liquid adhesive (OCLA) may be used when the air bubble occurs.

The display panel 3 is made up of a (transparent or semi-transparent) liquid crystal display panel, for example, applies birefringence of a liquid crystal, and includes a first substrate in which a color filter (CF), a light shielding layer, and an opposite electrode, for example, are formed on an insulating substrate such as glass and a second substrate in which a thin film transistor (TFT) which is a switching element and a pixel electrode, for example, are formed on an insulating substrate such as glass. The display panel 3 is made up of, for example, a spacer for keeping an interval between the first substrate and the second substrate, a sealing member to bond the first substrate and the second substrate, a liquid crystal sandwiched between the first and second substrates, a sealant of an inlet from which the liquid crystal is injected, an alignment film for aligning the liquid crystal, a polarization plate (not shown) disposed on outer surfaces of the first and second substrates, and a drive integrated circuit (IC) disposed on an outer periphery of the second substrate or on a tape carrier package (TCP) or chip on film (COF) which is a tape-like wiring material connected to the periphery of the second substrate.

A touch panel not shown is disposed on the display surface 31 of the display panel 3 in some cases. The touch panel converts information regarding a positional coordinate being input from outside (a user) by a circuit of a transparent electrode formed on a transparent substrate into an electrical signal, and transmits the electrical signal to a control circuit, which is a final product, via an output wiring unit connected to an end portion of the touch panel. Used as the output wiring unit is a flexible printed circuit (FPC) in which a wiring is formed on a film-like base material in accordance with a degree of freedom of connection according to thinness and flexibility, however, a different material or structure may be adopted as long as it has an equivalent function and characteristic.

Figure 6:
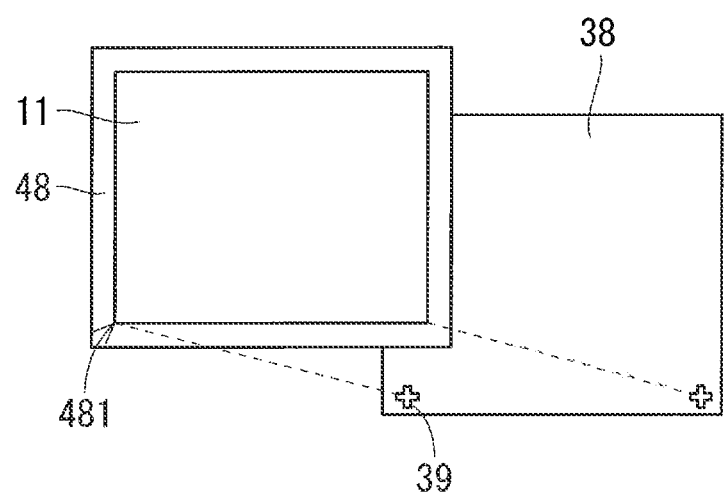
FIG. 6 is a plan view for describing a position adjustment of a general display device.

A general display device is described herein. FIG. 6 shows a general display device made up of a rectangular display panel 38 and the protection member 1. As illustrated in FIG. 6, the general display device includes a reference mark 39 in a peripheral region of the rectangular display panel 38 to adjust a position to the protection member 1 and the protection member 1 on which a rectangular print part 48 is provided. The print part 48 is formed to have the rectangular shape, thus a corner part 481 is formed in an inner side, and this configuration enables the position adjustment of the reference mark 39 of the display panel 38 with the corner part 481 of the rectangular print part 48 formed on the protection member 1.

Figure 3:
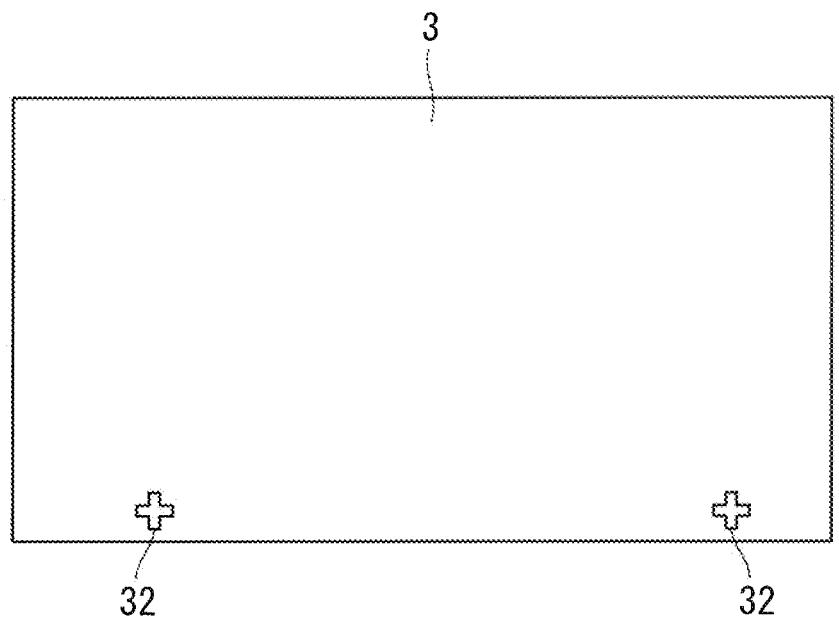
FIG. 3 is a plan view of a display panel constituting the display device of the present invention.
Figure 4:
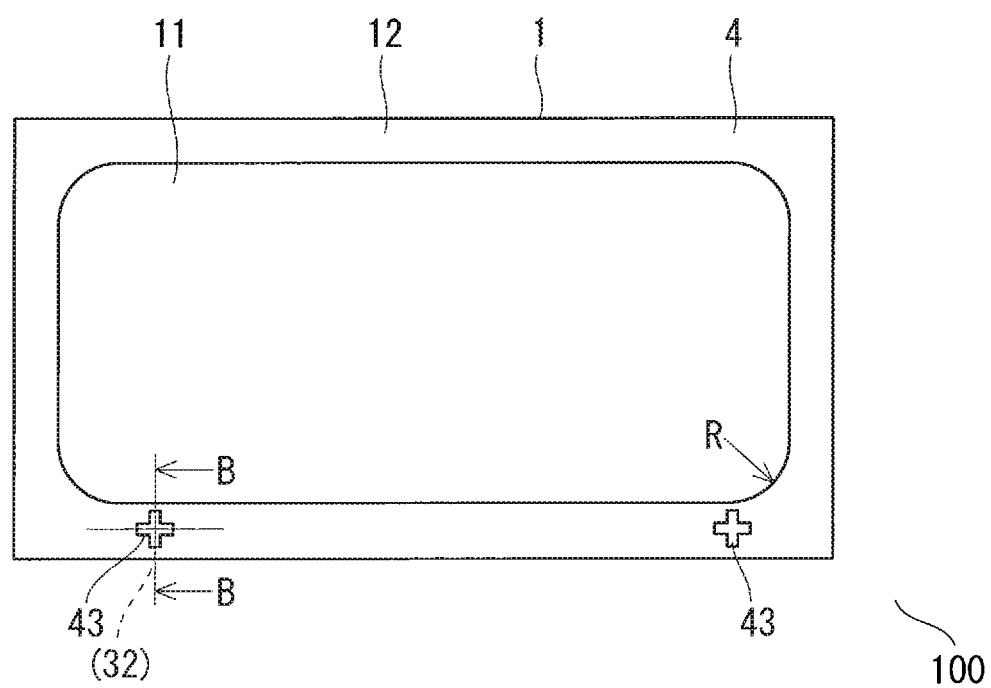
FIG. 4 is a plan view of a protection member constituting the display device of the present invention.
Figure 5:
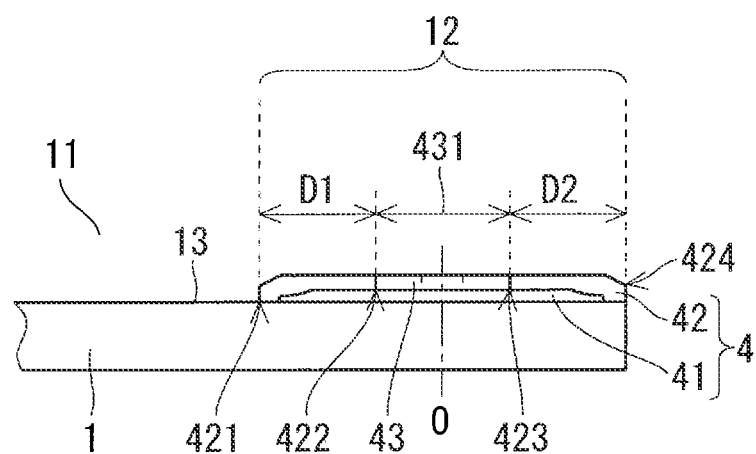
FIG. 5 is a cross-sectional along a B-B line in FIG. 4.

The display device of the present invention is described. FIG. 3 is a plan view of a display panel of the present invention viewed from a display surface side, FIG. 4 is a plan view of the protection member 1 viewed from a rear surface side (an opposite side of the display surface), and FIG. 5 is a cross-sectional view along a B-B line in FIG. 4. The print part 4 is not blacked out for a purpose of explanation in the drawings. As described above, the protection member 1 of the present invention has a shape other than the rectangular shape, and does not include a corner part (481 in FIG. 6) in the inner side of an area where the print part 4 is formed but includes a corner having a curvature. Thus, the corner part 481 of the print part 48 cannot be used as a mark for the position adjustment as is the case in the general display device illustrated in FIG. 6. Thus, formed in the present invention are a reference mark 32 formed on the display panel 3 illustrated in FIG. 3 for adjusting the position to the protection member 1 and a reference mark 43 in a peripheral region of the protection member 1 illustrated in FIG. 4, which is a region in which a frame-like black-frame print is provided, that is to say, in the print part 4. The display panel 3 is disposed so that the reference mark 43 of the protection member 1 coincides with the reference mark 32 of the display panel 3 (illustrated by a dotted line in FIG. 4). At this time, a center 431 of the reference mark 43 is set, and the position adjustment with the reference mark 32 of the display panel is performed.

The reference mark 43 formed in the region in which the print part 4 is formed in the protection member 1 is described in detail. As illustrated in FIG. 1, FIG. 4, and FIG. 5, the print part 4 is formed on a surface (a rear surface 13), which is one surface of the protection member 1 and on which the display panel 3 is disposed, to be sequentially formed to have a frame-like shape in a plan view. Firstly, the print layer 41 as the first layer is disposed as a coloring layer with a black color or a color which enables light shielding, and the print layer 42 as the second layer is disposed to have an overlap with the print layer 41 as the first layer. The print layer 42 as the second layer is not disposed in a predetermined position in which the reference mark 43 is formed. That is to say, a hole having a shape corresponding to the reference mark 43 is formed. In the present embodiment 1, as illustrated in FIG. 1, the reference mark 43 has a cross shape, and the print layer 42 as the second layer having a cross-shaped hole is disposed to have the overlap with the print layer 41 as the first layer.

The reference mark 43 provided on the protection member 1 is provided on the print layer 41 as the first layer of the print part 4 as illustrated in FIG. 5. When the print layer 42 as the second layer is disposed to have the overlap with the print layer 41 as the first layer and the print part 4 is formed in the peripheral region 12 surrounding the display region 11, an end portion 422 forming a region 431 including a center O of the reference mark 43 is formed with a predetermined distance D1 from an end portion of the print part 4. An end portion 424 of the protection member 1 is formed with a predetermined distance D2 from the other end portion 423 on an opposite side of the end portion 422 of the region 431 including the center O of the reference mark 43. As described above, the distance D1 and the distance D2 to the region 431 including the center O are accurately formed to ensure a predetermined area of the reference mark 43, thus an accuracy in a distance from the display region 11 to the reference mark 43 is secured. A color density of the print layer 41 as the first layer and the print layer 42 as the second layer is recognized using a camera (not shown) for identifying the reference mark 43. The region 431 including the center O of the reference mark 43 is recognized, and is made to coincide with a center of the reference mark 32 formed on the display panel 3. A coloring layer with a color which enables light shielding may be adopted as the print layer 41 as the first layer and the print layer 42 as the second layer, and each of the print layers may be formed of a print layer with the black color or a color different from each other.

As described above, when the print part 4 of the protection member 1 is made up of the coloring layer with the black color and the print layer 42 as the second layer is provided on the print layer 41 as the first layer, the cross-shaped hole is formed and disposed in the predetermined position of the print layer 42 as the second layer to form the reference mark 43, thus it is hard to visually recognize the reference mark 43 from a side of the print layer 41 as the first layer, that is to say, the display surface side. The reference mark 43 can be disposed even in a position which is not hidden by the other member such as a chassis of a customer. Accordingly, the reference mark 43 is formed on the black-frame print 41 as the first layer, thus can be formed in an optional position, and a degree of freedom in designing is increased.

Figure 7:
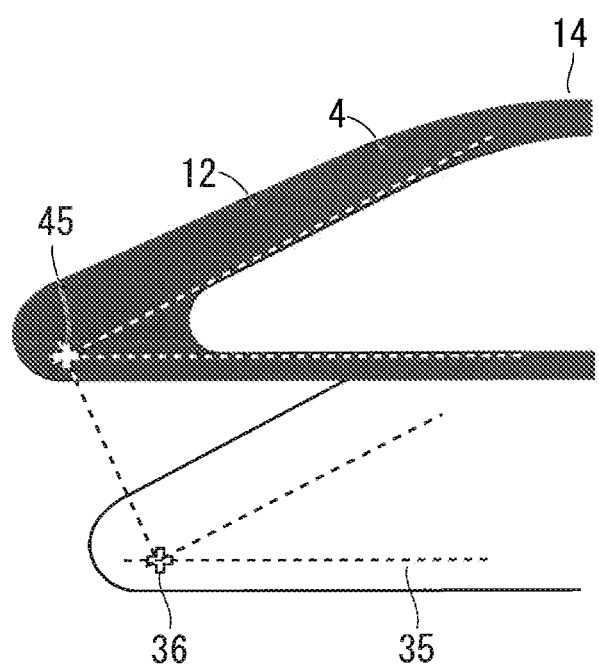
FIG. 7 is a plan view for describing a position adjustment of the display device according to the present invention.
Figure 8:
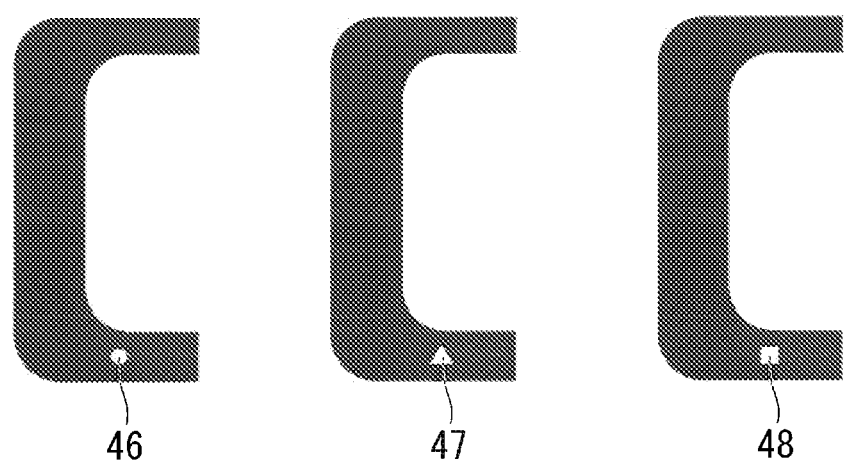
FIG. 8 is a partial plan view of a protection member indicating a modification example in the present invention.

FIG. 7 is a plan view for describing the position adjustment of the display device of the present invention. As illustrated in FIG. 7, the position adjustment with a reference mark 36 formed on a display panel 35 can be performed even when a protection member 14 has a corner with a special shape other than the curvature in the inner side of an area where the print part 4 is formed (the corresponding display panel 35 also has the similar shape) as long as a reference mark 45 can be formed in the print part 4. The print part 4 illustrated in FIG. 7 partly includes a substantial U-shape. It is possible to form the reference mark 45 in a center of an intersection between extension lines of the substantial U-shape and make the reference mark 45 coincide with the reference mark 36 formed on the display panel 35 facing the protection member 14. Any shape such as a circle shape 46, a triangle shape 47, and a square shape (including a polygonal shape) 48, for example, may be applied instead of the cross shape as long as the center of the reference mark 45 can be set therein.

Embodiment 2

In the embodiment 1, the cross-shaped hole is formed in the print layer 42 as the second layer in the print part 4 to form the reference mark 43. In the embodiment 2, as illustrated in FIG. 9, a print part 5 has a configuration that a print layer 51 as a first layer of a black print and a print layer 52 as a second layer of a colored printing are formed in a laminated form, then a print layer 53 as a third layer is laminated thereon, and a hole is provided in a part of the print layer 53 to form a reference mark 541.

A method of manufacturing the print part 5 in the embodiment 2 is described. After the black print of the print layer 51 as the first layer is formed, the colored printing of the print layer 52 as the second layer is formed on the black-frame print of the print layer 51 as the first layer. Subsequently, the print layer 53 as the third layer is formed in a black-frame print. The black-frame print of the print layer 53 as the third layer is formed in an area ranging from an end portion 55 on the display region 11 to a reference mark 54 and from the reference mark 54 to an end of the protection member 1. The print layer 53 as the third layer ranges from the end portion 55 on the display region 11 to the reference mark 54, thus an accuracy of position ranging from the display region 11 to the center 541 of the reference mark 54 is ensured. The accuracy of position at this time ranges from an end portion of the print layer 53 as the third layer on the display region 11 to and end portion of the reference mark 54. That is to say, the print layer 53 as the third layer is not disposed in the position where the reference mark 54 is formed to have the overlap with the print layer 52 as the second layer, and the print layer 53 as the third layer is formed to have the overlap with the position other than the reference mark 54. In this manner, the reference mark 54 is formed on the colored printing of the print layer 52 as the second layer. In the manner similar to the embodiment 1, the embodiment 2 has the structure that the reference mark 54 is not visually recognized from the display surface, thus the reference mark 54 can also be disposed in a position which is not hidden by a chassis of a customer. The reference mark 54 can be disposed anywhere on the colored printing.

The reference mark 54 is disposed on the colored printing of the print layer 52 as the second layer. The reference mark 54 is formed on the colored printing 52 having the different color from the print layer 53 as the third layer, thus the reference mark 54 can be easily recognized from the rear surface side. In a case where the reference mark 54 is recognized using a camera, a camera which is not highly accurate may suffice in the camera recognition by reason that the reference mark 54 is disposed in the colored printing part, thus the reference mark 54 can be visually recognized.

While the invention has been shown and described in detail, the foregoing description is in all aspects illustrative and not restrictive. It is therefore understood that numerous modifications and variations can be devised without departing from the scope of the invention.

What is claimed is:

1. A display device, comprising:
an electrooptical panel; and
a protection member comprising a plate member, the protection member facing the electrooptical panel and covering at least a portion of the electrooptical panel, thereby protecting the electrooptical panel,
wherein
the protection member includes a first reference mark in a region peripheral to an array region of the electrooptical panel, and
the electrooptical panel overlaps with the protection member and includes a second reference mark in a position corresponding to the first reference mark, such that the first reference mark and the second reference mark at least partially overlap with each other.

2. The display device of claim 1, wherein the protection member has a curved corner.

3. The display device of claim 1, wherein the protection member has four curved corners.

4. The display device of claim 1, wherein the first reference mark is at least partially cross shaped.

5. The display device of claim 4, wherein the second reference mark is at least partially cross shaped.

6. The display device of claim 1, wherein the first reference mark is selected from the group of circle shaped square shaped and triangular shaped.

7. The display device of claim 1, wherein the first reference mark has a different color than a color of the second reference mark.

8. The display device of claim 1, wherein the first reference mark at least partially overlaps the second reference mark in plan view.

9. The display device of claim 1, wherein the first reference mark at least partially does not overlap the second reference mark in plan view.

10. The display device of claim 7, wherein the first reference mark at least partially does not overlap the second reference mark in plan view.

11. The display device of claim 1, wherein at least one of the first reference mark or the second reference mark is black.

12. The display device of claim 1, wherein centers of the first reference mark and second reference mark coincide.

13. The display device of claim 2, wherein the first and the second reference marks are at least partially cross shaped.

14. The display device of claim 2, wherein the first reference mark is selected from the group of circle shaped, square shaped and triangular shaped.

15. The display device of claim 2, wherein the first reference mark has a different color than a color of the second reference mark.

16. The display device of claim 2, wherein the first reference mark at least partially overlaps the second reference mark in plan view.

17. The display device of claim 2, wherein the first reference mark at least partially does not overlap the second reference mark in plan view.

18. The display device of claim 2, wherein at least one of the first reference mark or the second reference mark is black.

19. The display device of claim 3, wherein the first reference mark has a different color than a color of the second reference mark.

20. The display device of claim 15, wherein the first reference mark at least partially does not overlap the second reference mark in plan view.

* * * * *